United States Patent
Levy et al.

(10) Patent No.: US 9,315,158 B2
(45) Date of Patent: Apr. 19, 2016

(54) SUN VISOR HOUSING FOR SUNGLASSES

(71) Applicant: NAVAJO MANUFACTURING CO., INC., Denver, CO (US)

(72) Inventors: Gordon Levy, Golden, CO (US); Hoi Kwan Wong, Thornton, CO (US)

(73) Assignee: Navajo Manufacturing Company, Inc., Denver, CO (US)

( * ) Notice: Subject to any disclaimer, the term of this patent is extended or adjusted under 35 U.S.C. 154(b) by 113 days.

(21) Appl. No.: 14/011,558

(22) Filed: Aug. 27, 2013

(65) Prior Publication Data

US 2015/0060507 A1     Mar. 5, 2015

(51) Int. Cl.
*B60R 7/05*     (2006.01)
*B60R 7/08*     (2006.01)

(52) U.S. Cl.
CPC .. *B60R 7/05* (2013.01); *B60R 7/082* (2013.01)

(58) Field of Classification Search
CPC .......... A45C 11/04; B60R 7/05; B60R 7/082
USPC ............... 224/312; 220/230, 831, 832; 206/6; D3/266
See application file for complete search history.

(56) References Cited

U.S. PATENT DOCUMENTS

| | | | |
|---|---|---|---|
| 353,203 A | 11/1886 | Chase | |
| 2,642,987 A | 6/1953 | Castelli | |
| 2,735,597 A | 2/1956 | Treleven | |
| 3,152,716 A * | 10/1964 | Feldhahn | 220/230 |
| 3,600,069 A | 8/1971 | McNeill | |
| 3,825,110 A | 7/1974 | Halbich et al. | |
| 3,876,295 A | 4/1975 | Loughner | |
| 4,000,810 A | 1/1977 | Leblanc | |
| 4,163,607 A | 8/1979 | Nannini | |
| 4,247,178 A | 1/1981 | Cook | |
| 5,164,749 A | 11/1992 | Shelton | |
| D371,458 S * | 7/1996 | Valls | D3/266 |
| D406,944 S | 3/1999 | Troutman | |
| 5,949,517 A | 9/1999 | Lindberg et al. | |
| 6,382,482 B1 | 5/2002 | Chao | |
| 6,431,351 B1 * | 8/2002 | Lin | 206/224 |
| 6,726,004 B2 | 4/2004 | Watson | |
| 7,101,040 B2 | 9/2006 | Karasik | |
| 2010/0181227 A1 * | 7/2010 | Tolkowsky | 206/755 |
| 2011/0210018 A1 | 9/2011 | Friedman et al. | |

* cited by examiner

*Primary Examiner* — Corey Skurdal
(74) *Attorney, Agent, or Firm* — Studebaker & Brackett PC (57) ABSTRACT

A housing to locate sunglasses or clip-on sunglasses directly in front of a driver by securing the sunglasses or clip-on sunglasses in a container clipped to the sun visor of an automobile. In addition, the sunglasses or clip-on sunglasses are held firmly in place in a compartment of different configurations such that the sunglasses or clip-on sunglasses are readily available in a position immediately in front of a driver. The container is secured to the visor by a wire clip or other appropriate connection to the sun visor. A portion of the compartment folds away from the portion of the container which is clipped or fixed to the visor. The movable portion of the container is held firmly in place in a closed position as well as in an open condition by a magnet or other secure connection device.

15 Claims, 11 Drawing Sheets

SUN VISOR HOUSING FOR SUNGLASSES

FIELD OF THE INVENTION

The present invention relates to the field of sunglasses for locating the sunglasses in a container on the sun visor of an automobile.

BACKGROUND OF THE INVENTION

During automobile travel, it is a frequent problem to keep track of the location of a driver's sunglasses or clip-on sunglasses. Oftentimes, the sunglasses or clip-on sunglasses are placed in various locations making it difficult for the sunglasses to be readily accessed.

Typically, the sunglasses or clip-on sunglasses may be located in a glove compartment, a cup holder, on the dashboard, or side-pockets of a door. This makes it difficult for one to readily access these sunglasses or clip-on sunglasses for prescription glasses, when needed, during driving. During driving at sunrise or sunset, direct sunlight is encountered for which there is no quick fix by the use of sunglasses. This can cause problems with vision during driving which can produce potentially dangerous conditions.

SUMMARY OF THE INVENTION

Accordingly, it is an object of the present invention to locate sunglasses or clip-on sunglasses directly in front of a driver by securing the sunglasses or clip-on sunglasses in a container clipped to the sun visor of an automobile. In addition, the sunglasses or clip-on sunglasses are held firmly in plate in a compartment of different configurations such that the sunglasses or clip-on sunglasses are readily available in a position immediately in front of a driver.

This object is accomplished by a container which is secured to the visor by a wire clip or other appropriate connection to the sun visor. A portion of the compartment folds away from the portion of the container which is clipped or fixed to the visor. The movable portion of the container is held firmly in place in a closed position as well as in an open condition by a magnet or other secure connection device.

When access to the sunglasses or clip-on sunglasses is desired, a portion of the container is folded down about a hinge interconnecting the movable or pivotal portion of the container with a fixed portion of the container. The pivotal portion is moved towards the driver so as to provide access to the sunglasses or clip-on sunglasses. To avoid the pivotal portion of the container from hanging in a direction towards the driver, which can cause a distraction to the driver, the pivotal compartment portion is moved to extend from its initial closed position by 180 degrees and secured in position by a magnet or other connection device. The pivotal portion is thereby held firmly in place out of the way and view of the driver.

Accordingly, it is another object of the present invention to locate sunglasses directly in front of a driver by securing the sunglasses in a container clipped to the sun visor of an automobile, with a pivotal portion of the container being held in a secure closed position by a magnet or other connection device.

It is still yet another object of the present invention to locate sunglasses directly in front of a driver by securing the sunglasses in a container clipped to the sun visor of an automobile, with a pivotal portion of the container being held in a secure closed position by a magnet or other connection device, and with the pivotal or movable portion of the container being pivotally mounted to move down towards the driver and then away from the driver.

It is still yet another object of the present invention to locate sunglasses directly in front of a driver by securing the sunglasses in a container clipped to the sun visor of an automobile, with a pivotal portion of the container being held in a secure closed position by a magnet or other connection device, and with the pivotal or movable portion of the container being pivotally mounted to move down towards the driver and then away from the driver, and with the pivotal container portion being held in a secure open position by a magnet or other connection device.

These and other objects of the invention, as well as many of the intended advantages thereof, will become more readily apparent when reference is made to the following description taken in conjunction with the accompanying drawings.

BRIEF DESCRIPTION OF THE DRAWINGS

The following drawings illustrate examples of various components of the invention disclosed herein, and are for illustrative purposes only. Other embodiments that are substantially similar can use other components that have a different appearance.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to the drawings, in general, and to FIGS. 1 through 7 in particular, a sunglass container or housing embodying the teachings of the subject invention is generally designated as 20. With reference to its orientation in FIG. 1, the sunglass container includes a housing 22 which contains a pair of clip-on sunglasses 21, shown in phantom lines. The illustrated pair of clip on sunglasses 24 are illustrative of the concepts of the present invention. However the use of a complete pair of sunglasses including side temples is also embodied in the present invention.

Figure 1:
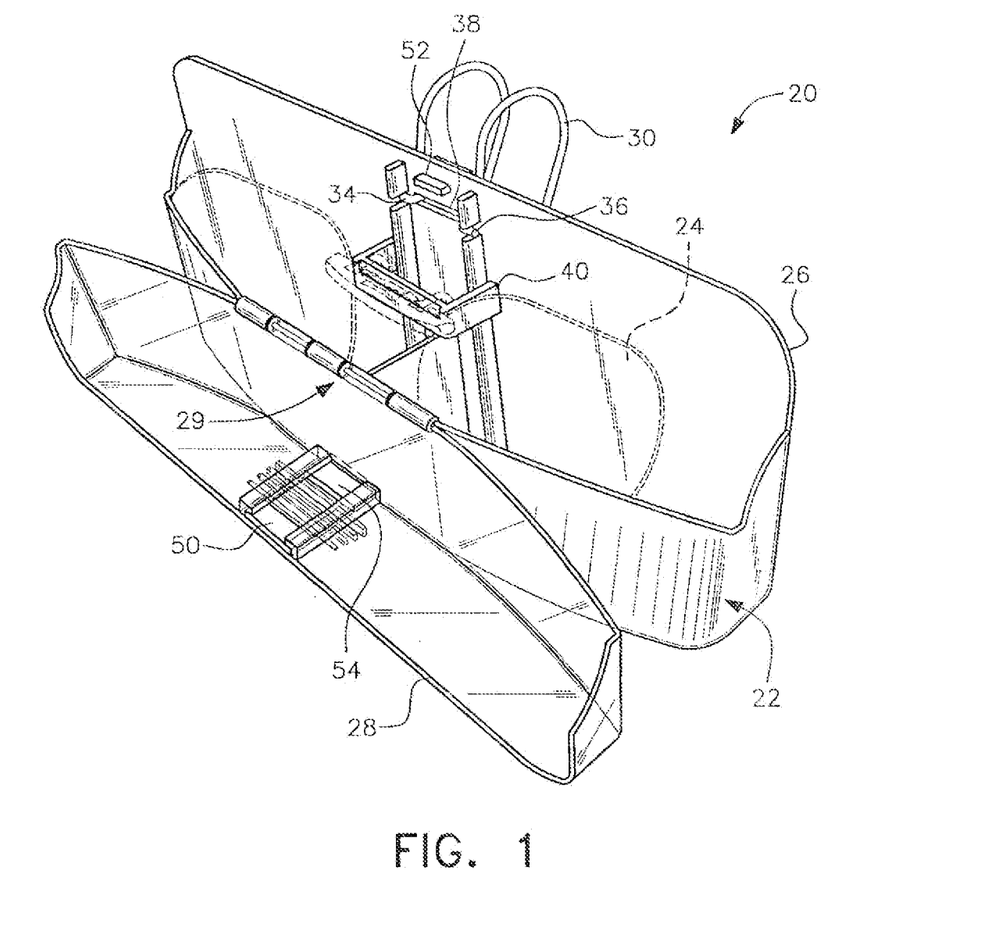
FIG. 1 illustrates a perspective view of the present invention with a portion of a sunglass container being pivoted away from a fixed portion of the container which is mounted on a visor of an automobile.

As shown in FIG. 1, housing 22 includes fixed housing portion 26 and pivotally mounted housing portion 28 which is mounted on fixed housing portion 26 by a hinge 29. As shown in FIG. 1, the housing portion 28 is pivoted away from housing portion 26. In this embodiment, housing portion 28 is transparent as shown in FIG. 2 which also shows the housing portion 28 in the closed position to close the housing 22 and retain any included sunglasses.

Figure 2:
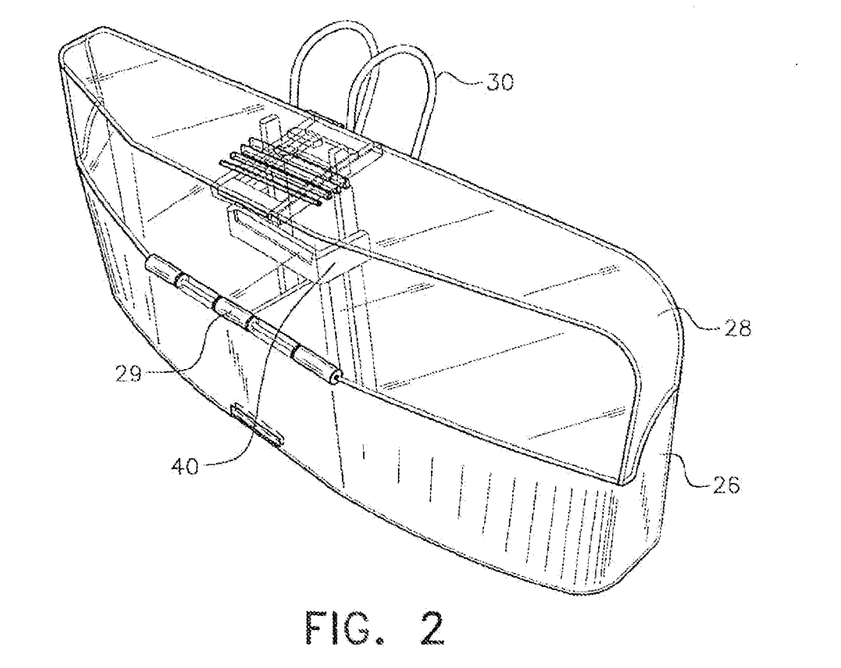
FIG. 2 illustrates the container in a closed position.
Figure 3:
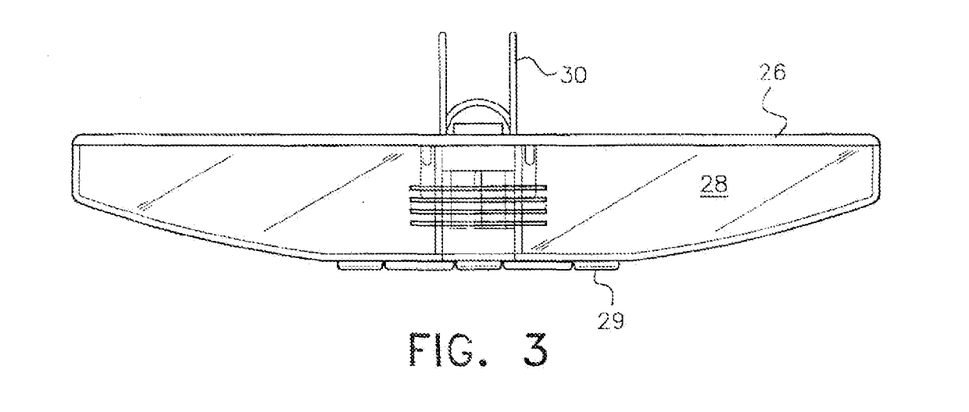
FIG. 3 is a top view thereof.
Figure 4:
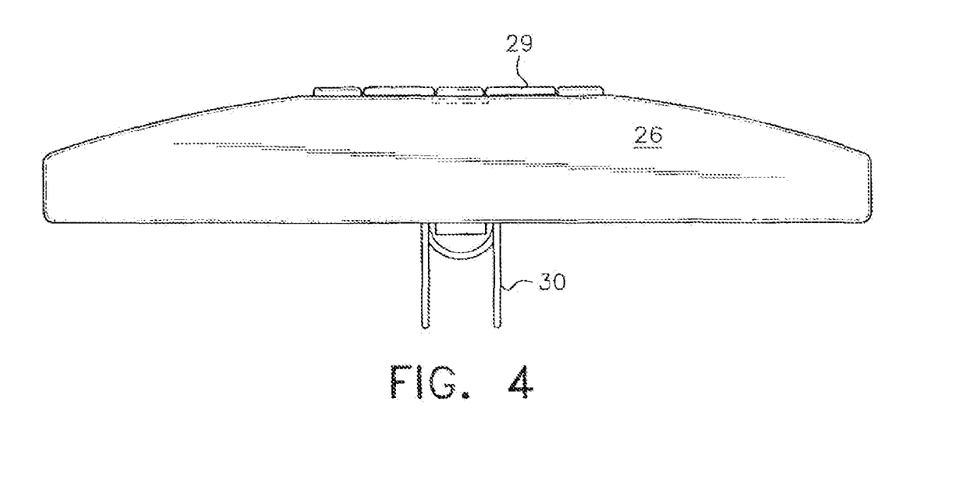
FIG. 4 is a bottom view thereof.
Figure 5:
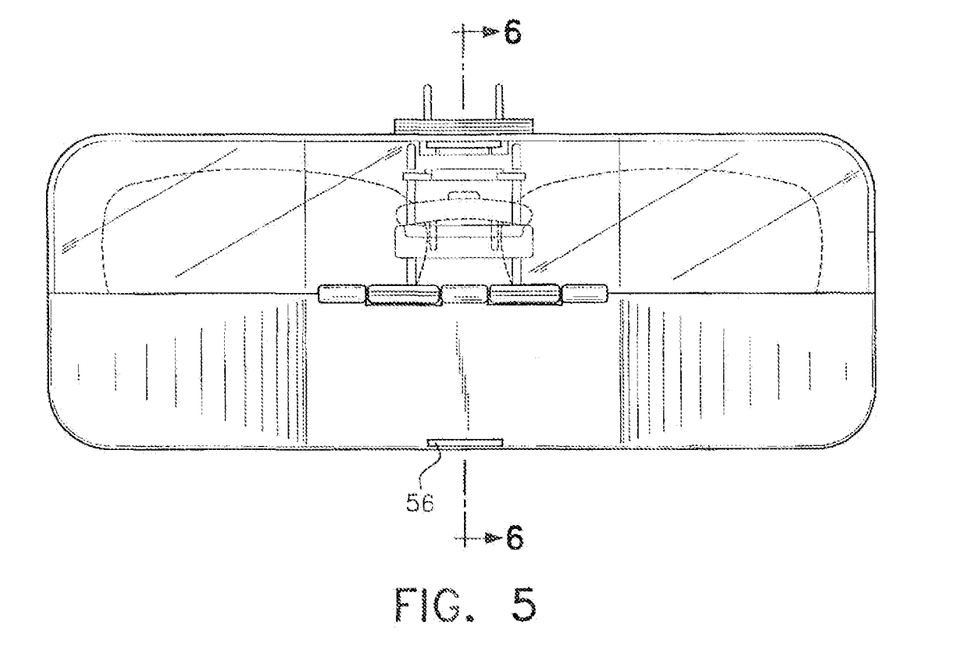
FIG. 5 is a front view thereof.
Figure 6:
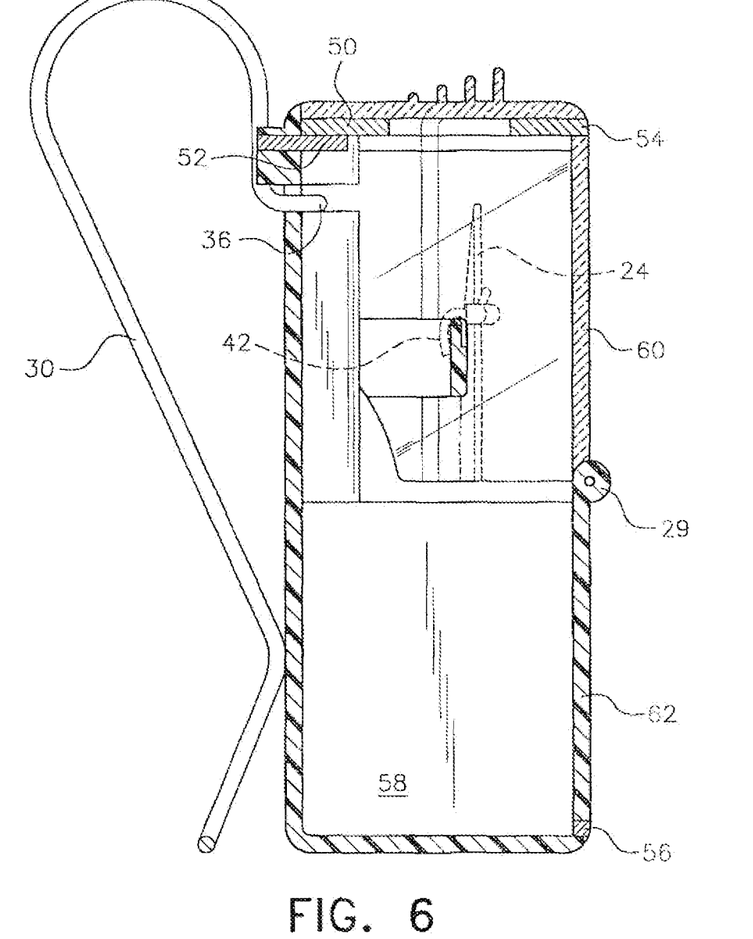
FIG. 6 is a sectional view taken along line 6-6 of FIG. 5.
Figure 7:
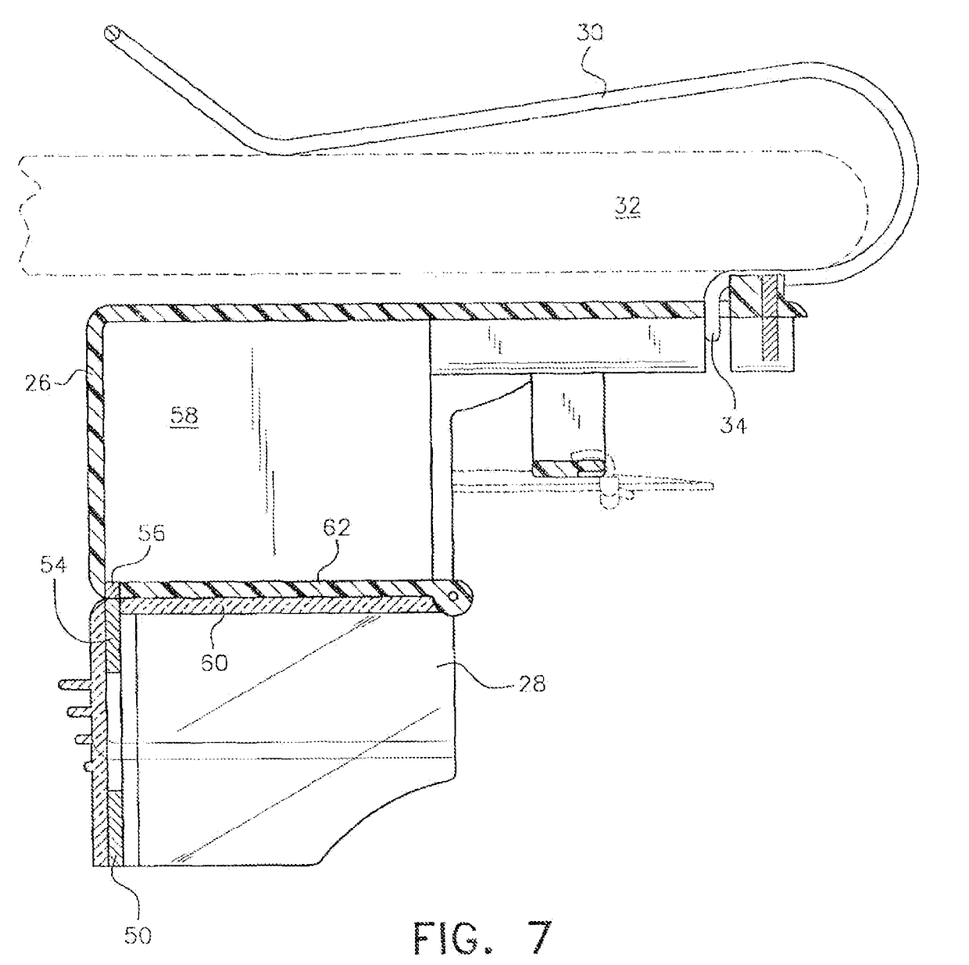
FIG. 7 illustrates the container in use mounted onto the visor of an automobile with the pivotal portion secured in place in an open position so as to provide access to sunglasses or clip-on sunglasses held within the container.
Figure 8:
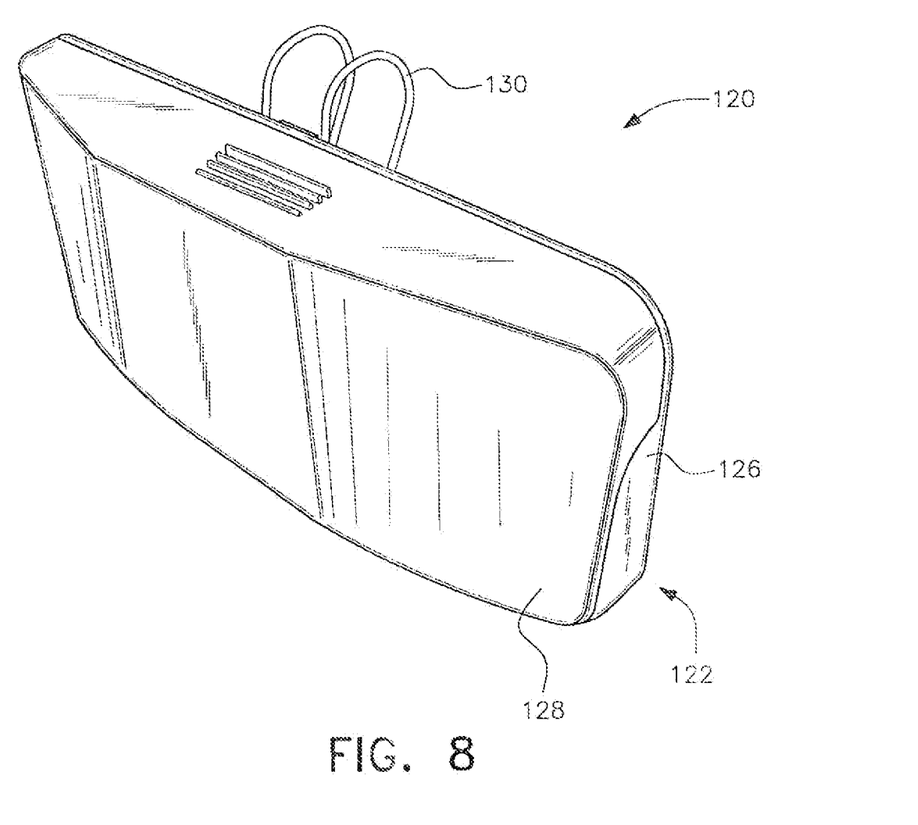
FIG. 8 is a perspective view of an alternate embodiment of the present invention.

As shown in FIGS. 1 and 2, housing portion 26 includes a U-shaped clip 30 which may be used to secure the housing 22 to the visor of 32 of an automobile, for example, as best shown in FIG. 7. Free ends 34, 36 of the clip 30 are anchored within the interior housing portion 26 after passing through a slot 38.

In the embodiment of FIGS. 1 through 7, the interior of the housing 22 includes a U-shaped bar 40 onto which a pair of clip-on sunglasses may be secured by a pivotal hook 42 of the clip-on sunglasses 24. However, it is appreciated that the U-shaped bar may be omitted if a fill set of sunglasses with side temples is to be housed in the container 22.

In the closed position of the container shown in FIG. 2, a pair of sunglasses may be mounted onto the visor of a driver or passenger in the front seat of an automobile. It is understood that the clip 30 will engage the visor 32 to mount the container 22 in approximately a horizontal orientation. In this position, a magnetic bar or plate 50, engages with and is held in position on a metal bar 52 of the fixed housing portion 26.

However, when access to the interior of the housing 22 is desired, as shown in FIG. 7, a second magnet 54 on the pivotal housing portion 28 engages with a metal bar 56 located near a bottom area 58 of the interior of the housing portion 26. By the engagement of the magnet 54 and the metal bar 56, the pivotally mounted housing portion 28 is fixed in position in contact with the fixed housing portion 28. Access to the interior of the fixed housing portion 26 is thereby achieved to retrieve a pair of sunglasses without the concern for the location of the pivotal housing portion 28 potentially interfering pivotal the line of sight of a driver. In this position, the front wall portion 60 of the pivotal housing portion 28 lies parallel to and in contact with the front wall portion 62 of the fixed housing portion 26.

Figure 9:
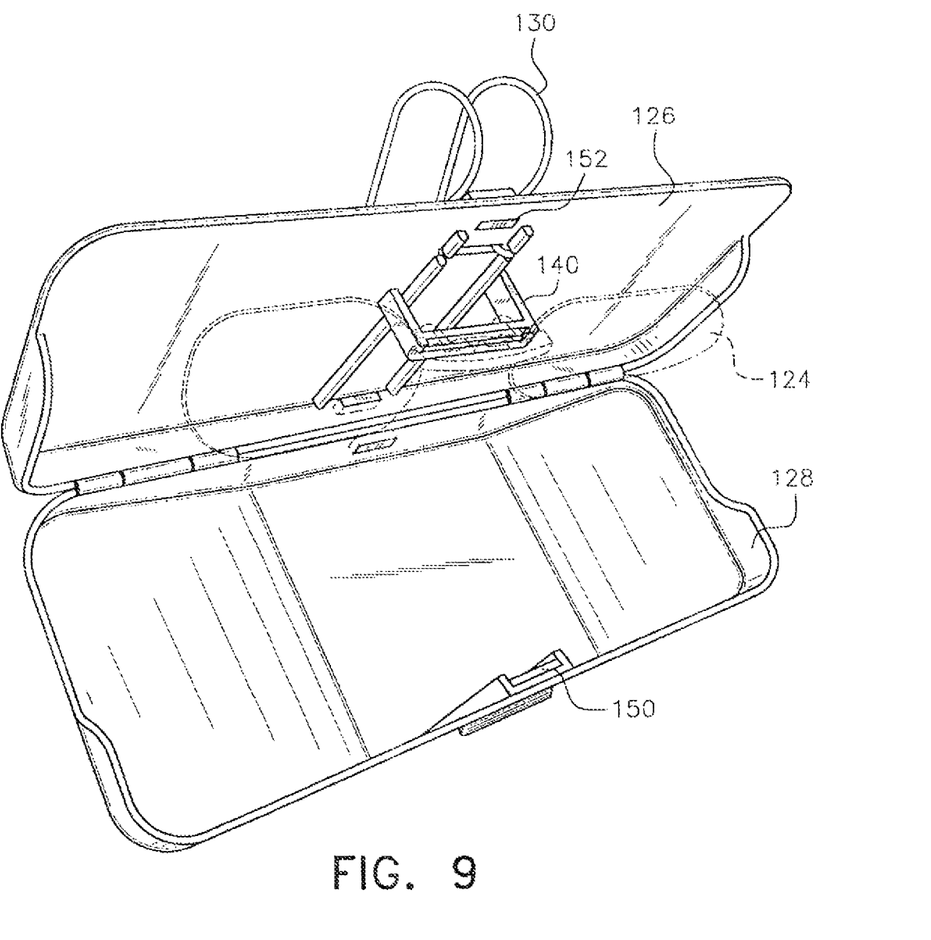
FIG. 9 illustrates a pivoting of a portion of the container moved in a direction away from the portion of the container fixed to the visor of an automobile.
Figure 10:
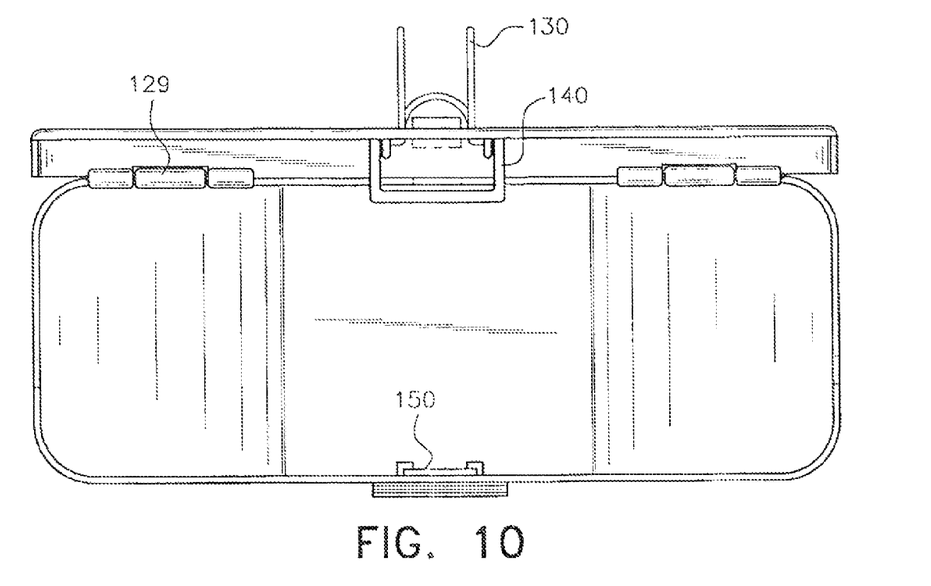
FIG. 10 is a top view of FIG. 9.
Figure 11:
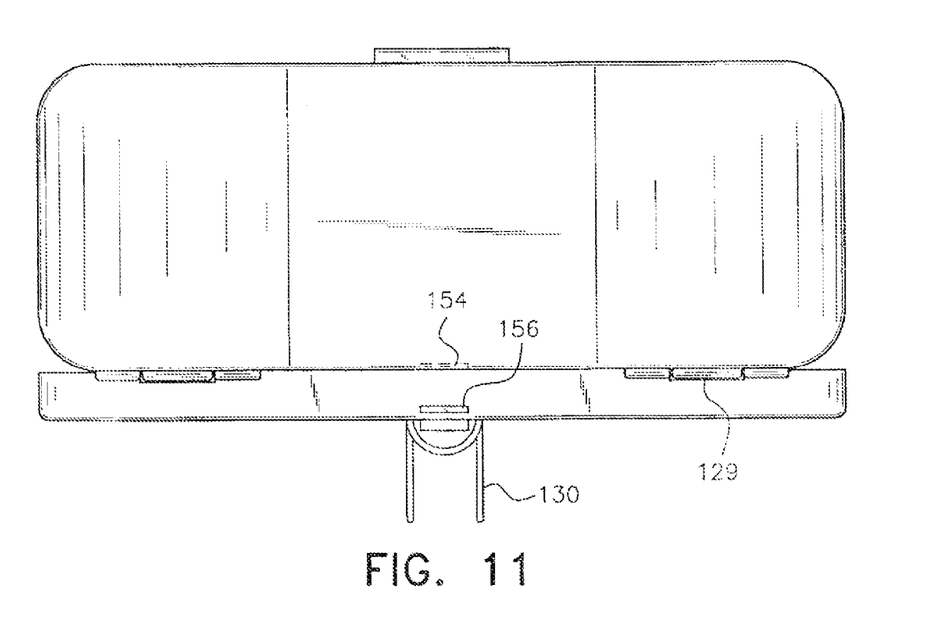
FIG. 11 is a bottom view of FIG. 9.
Figure 12:
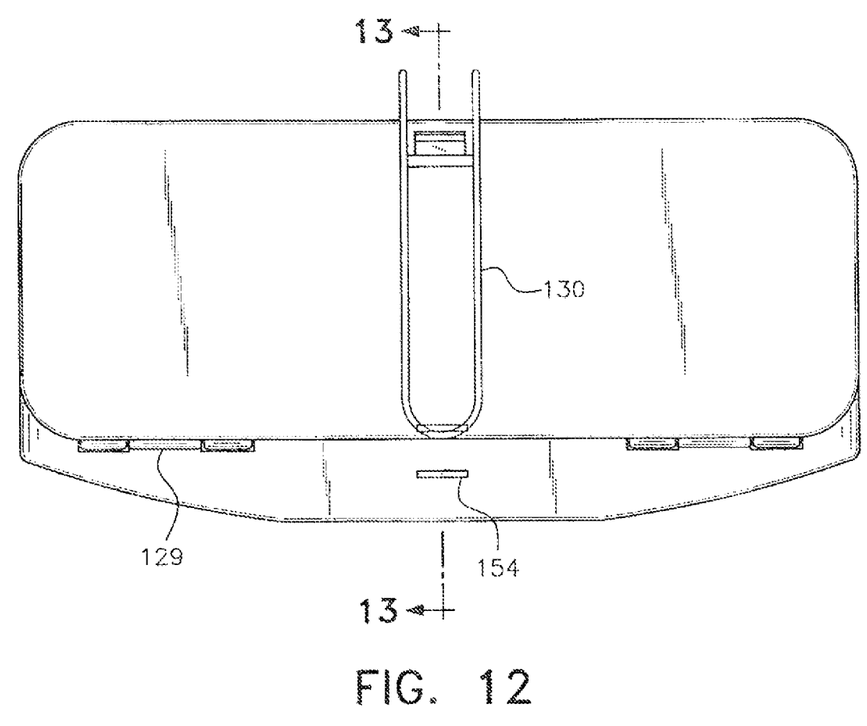
FIG. 12 illustrates the fixed container portion and the clip for mounting the container on a visor of an automobile.

With reference to FIGS. 8 through 14, similar features from those of FIGS. 1 through 7 will be preceded by the designation of 100. However, in FIGS. 8 through 14, the pivotal housing portion 128 extends across the entire front of the sunglass container 122. As shown in FIG. 9, by the pivoting away of the pivotal housing portion 128, the fixed housing portion 126 is exposed for access to the interior of the sunglass container and access to the clip on sunglasses 124.

Figure 13:
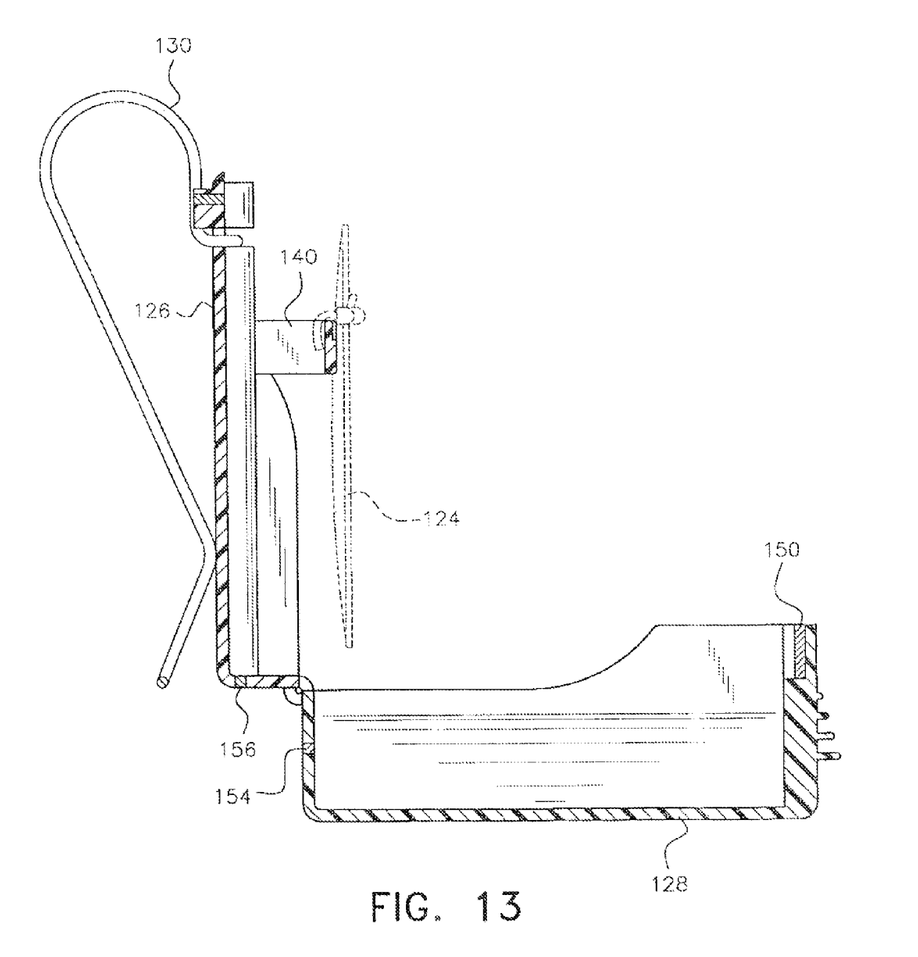
FIG. 13 is a sectional view taken along line 13-13 of FIG. 12.
Figure 14:
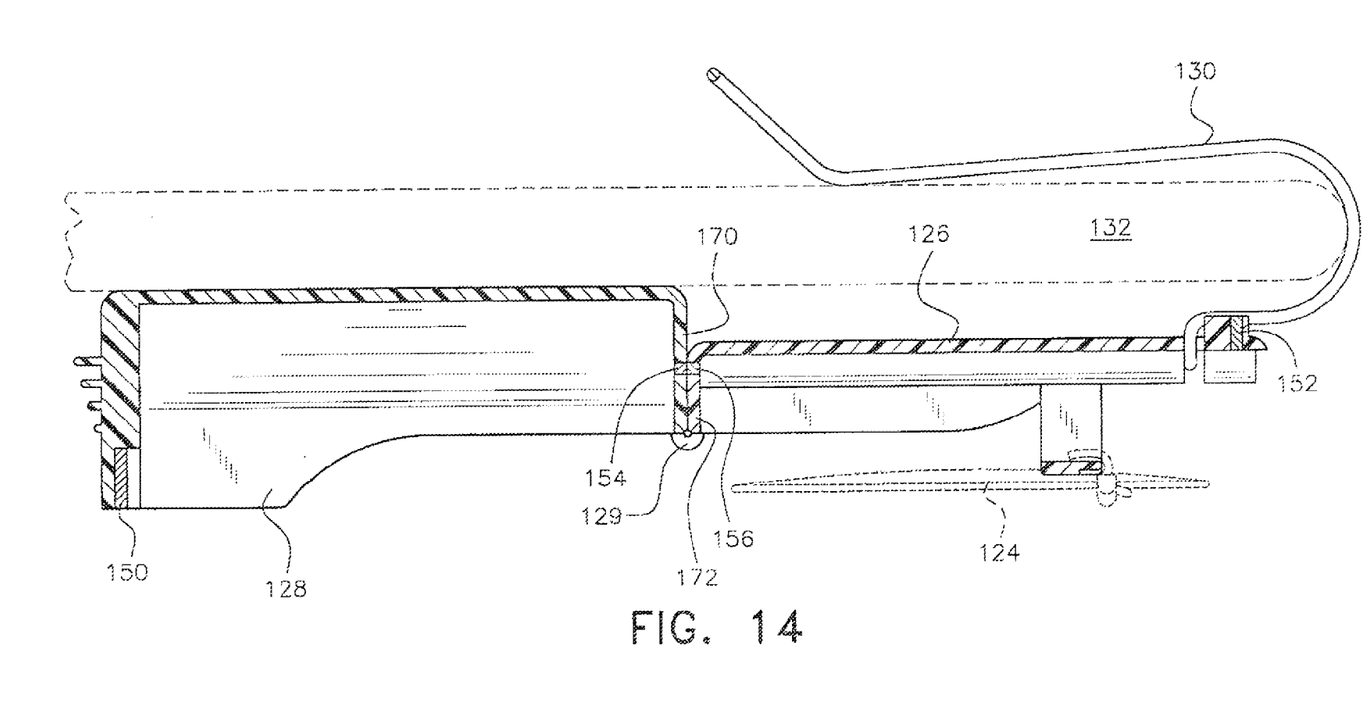
FIG. 14 illustrates the fully open position of the sunglass container of FIG. 8 with the movable portion of the container held in place so as to align itself parallel with a sun visor of an automobile.

As with the embodiment of FIGS. 1 through 7, FIGS. 8 through 14 include two magnets 150 and 154 which, as shown in FIG. 13, illustrate the pivoting of the pivotal housing portion 128 with respect to the fixed housing portion 126 so as to fully extend the pivotal housing portion 128, as shown in FIG. 14. In the fully extended position of the pivotal housing portion 128, the second magnet 154 engages with the second metal bar 156 so as in this embodiment, engage bottom surface 170 of pivotal housing portion 128 with the bottom surface 172 of the pivotal housing portion 126. In addition, hinge 129 in this embodiment is divided into two portions so as to allow magnet 154 and metal bar 156 to engage each other to hold the pivotal housing portion 128 in the fixed and open position as shown in FIG. 14.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

We claim:

1. In combination, a container and a pair of clip-on sunglasses, said combination comprising
a fixed housing portion of the container for mounting on a visor of an automobile,
a movable housing portion of the container pivotally mounted on the fixed housing portion,
an interior portion defined between the fixed housing portion and the movable housing portion,
a connection for securing the movable housing portion in a closed position, and for releasing the movable housing portion to move to an open position,
a clip mounted on the fixed housing portion for mounting the fixed housing portion on the visor of the automobile, and
a support bar extending from the fixed housing portion into the interior portion, the support bar including at least one leg projecting perpendicular to the fixed housing portion,
the support bar including an engagement portion spaced by a gap from the fixed housing portion, said engagement portion extending perpendicular to the at least one leg and extending laterally beyond a plane of said at least one leg, and said engagement portion extending parallel to the fixed housing portion, and
a pivotal hook of the pair of clip-on sunglasses extending behind the engagement portion into the gap between the engagement portion and the fixed housing portion and grasping the engagement portion between the engagement portion and the fixed housing portion by a biased force from the pivotal hook to hold the pair of clip-on sunglasses in the interior portion.

2. The combination of claim 1, wherein the movable housing portion is approximately one half of a height of the fixed housing portion.

3. The combination of claim 1, wherein the movable housing portion is approximately equal to a height of the fixed housing portion.

4. The combination of claim 1, wherein the support bar is U-shaped and is secured to the fixed housing portion at two points by two legs, the two legs are interconnected by the engagement portion.

5. The combination of claim 1, wherein the connection is a magnet and a metal bar.

6. The container of claim 5, wherein the magnet is mounted on the movable housing portion.

7. The container of claim 5, wherein the connection includes a second magnet and a second metal bar.

8. The container of claim 6, wherein the magnet is located on an upper surface of the movable housing portion.

9. The container of claim 7, wherein the second magnet is located on an upper surface of the movable housing portion.

10. The container of claim 9, wherein the second metal bar is located on a front surface of the fixed housing portion.

11. The container of claim 7, wherein the second magnet is located on a bottom surface of the movable housing portion.

12. The container of claim 11, wherein the second metal bar is located on a bottom surface of the fixed housing portion.

13. The container of claim 12, wherein a hinge on the bottom surface of the fixed housing portion is connected to the bottom surface of the movable housing portion.

14. The container of claim 13, wherein the bottom surface of the movable housing portion is held engaged and extending parallel to the bottom surface of the fixed housing portion in the open position.

15. The container of claim 10, wherein a front surface of the movable housing portion engages the front surface of the fixed housing portion in the open position.

* * * * *